United States Patent [19]

Tautz et al.

[11] Patent Number: 5,357,421
[45] Date of Patent: Oct. 18, 1994

[54] METHOD FOR CLOSED-LOOP CONTROL OF TECHNICAL PROCESSES USING MULTIPLE CONTROLLERS

[75] Inventors: Wilfried Tautz, Forchheim; Georg Weihrich, Uttenreuth, both of Fed. Rep. of Germany

[73] Assignee: Siemens Aktiengesellschaft, Munich, Fed. Rep. of Germany

[21] Appl. No.: 12,686

[22] Filed: Feb. 3, 1993

[30] Foreign Application Priority Data

Feb. 4, 1992 [EP] European Pat. Off. ........ 92101818.0

[51] Int. Cl.$^5$ ...................... G05B 15/00; G11B 15/18
[52] U.S. Cl. .................................. 364/133; 395/903; 395/3; 395/61; 360/69
[58] Field of Search ........ 364/133, 148, 157, 161–163; 395/3, 61, 900, 902–906; 318/6, 7, 8; 360/69–73.14, 134; 242/201–203, 206–209, 186

[56] References Cited

U.S. PATENT DOCUMENTS

| | | | |
|---|---|---|---|
| 3,910,527 | 10/1975 | Buhler et al. | 318/7 |
| 4,328,933 | 5/1982 | Steel | 360/134 |
| 4,461,433 | 7/1984 | Kani | 318/7 |
| 4,620,241 | 10/1986 | Ono | 318/7 |
| 5,167,005 | 11/1992 | Yamakawa | 395/3 |
| 5,206,566 | 4/1993 | Yoshida et al. | 395/3 |

FOREIGN PATENT DOCUMENTS 3811086 10/1988 Fed. Rep. of Germany.
4040360 6/1991 Fed. Rep. of Germany.

OTHER PUBLICATIONS

Patent Abstracts of Japan, vol. 16, No. 5, Jan. 8, 1992, & JP-A-32 28 101, Oct. 9, 1991.
Proceedings of the 1987 American Control Conference, vol. 3, Jun. 10, 1987, Minneapolis, U.S., pp. 1662–1668, R. S. Ornedo et al.: *Design and Experimental Evaluation of an Automatically Reconfigurable Controller for Process Plants.*

*Primary Examiner*—Jerry Smith
*Assistant Examiner*—Jim Trammell
*Attorney, Agent, or Firm*—Kenyon & Kenyon

[57] ABSTRACT

Parallel-working controllers are provided to control processes whose performance is dependent upon working points. These controllers are allocated to selected working points, and their output signals are put into effect, after being weighted, in dependence upon the working-point parameters that have a dominant influence on the process performance. The method is preferably implemented using fuzzy logic. A transition which is smooth in terms of interpolation is possible among the controllers.

14 Claims, 3 Drawing Sheets

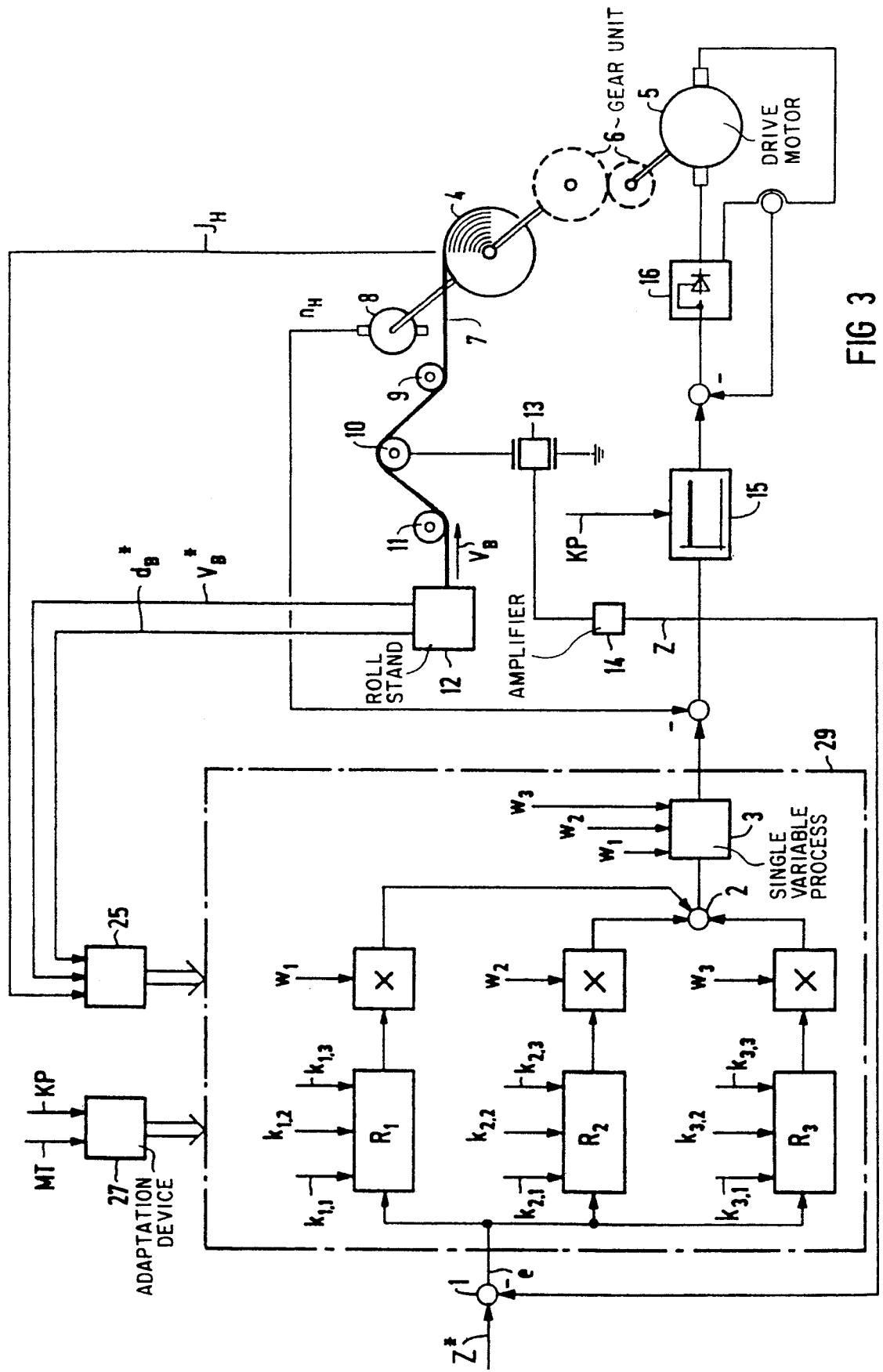

METHOD FOR CLOSED-LOOP CONTROL OF TECHNICAL PROCESSES USING MULTIPLE CONTROLLERS

BACKGROUND OF THE INVENTION

The present invention relates generally to methods for closed-loop control of technical processes, and more specifically to a closed-loop control method for control of technical processes that use multiple controllers, whereby the performance characteristics of these processes are clearly dependent on the working point that is active at the time. Working points can be defined by several variables, so-called working-point parameters. These parameters are not correlated to the directly controlled variable and are specified as fixed or variable parameters. Examples of such technical processes are controlling tape tension for reel-to-reel drives, controlling electrodes in arc furnaces, controlling turbine-driven generators, or controlling cement-production processes. To achieve invariably good control results in the different working points, then the closed-loop control device must be specifically adapted to the working point that is active at the time.

One could provide a specifically adapted controller for each individual working point and work only with this controller in the prevailing working-point environment. However, to cover the working range of interest, this would require an often unreasonably high number of individual controllers. Furthermore, the problem exists as to how to transition from one controller to the next controller in an uninterrupted and gradual manner.

The present invention is directed to the problem of developing a method that will allow a smooth, gradual transition from one controller to the other, when there are changes in working points, while simultaneously reducing the number of required controllers.

SUMMARY OF THE INVENTION

The present invention solves this problem by activating the multiple controllers in a weighted manner depending upon the working-point parameters that have a dominant influence on the process performance characteristics. The present invention makes the degree to which individual, parallel-working controllers participate in the closed-loop control events dependent upon the difference between the working point allocated to them at the time and the active working point. In this manner, one can achieve an "interpolating" controller operation, or rather controller transition, and the network of selected working points can be defined to be relatively wide-meshed, i.e., the network of selected working points can be spaced farther apart from each other and fewer of them are required to achieve the same performance.

The dominant parameters, which should be drawn upon to establish the working points, are selected to comply with the technology of the process. These parameters are supposed to significantly influence the process, so that the characteristic dependencies of the process performance on these parameters will result from the closed loop control. In the case of r working-point parameters, which are determined to be dominant, the potential operating points of the process lie in an r-dimensional space spanned by these working-point parameters. In the r-dimensional space, in which the process performance depends heavily on these parameters, the differences between the working points should be smaller than in the areas in which the dependencies are less pronounced. This makes it possible for all relevant properties of the process performance to be accurately acquired. The individual controller interpolations can be weighted on the basis of functions, which were determined empirically or in terms of a model, using the dominant working-point parameters as variables. This weighting can be realized, for example, using appropriate characteristic curves.

BRIEF DESCRIPTION OF THE DRAWINGS

FIG. 3 depicts an application of the method of the present invention for regulating tension for a reel-to-reel drive, with three dominant working-point parameters and two additional working-point parameters for adapting the controller parameters.

DETAILED DESCRIPTION

Figure 1:
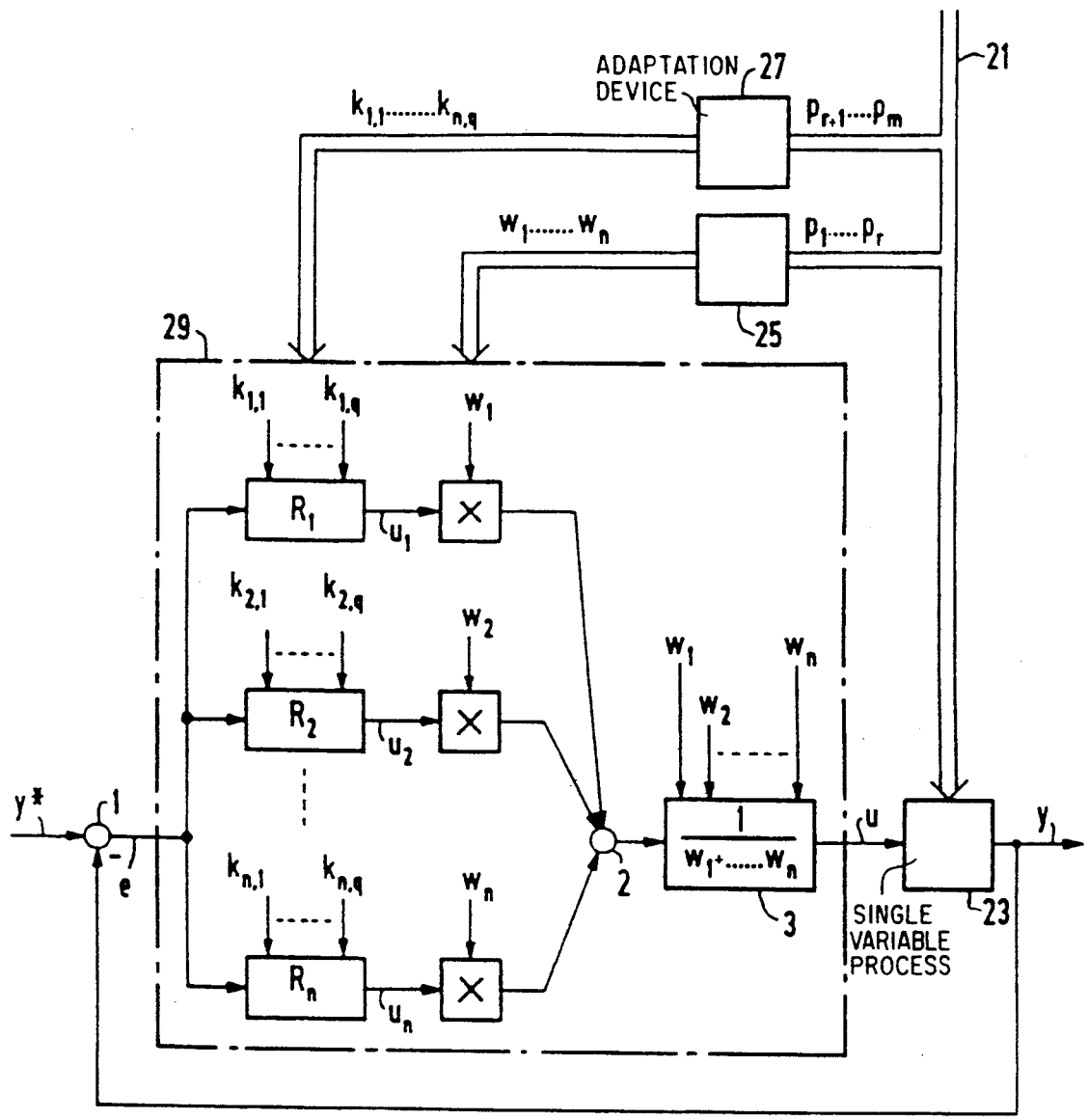
FIG. 1 a block diagram of a closed-loop control system operating according to the method of the present invention.

Referring to the block diagram of FIG. 1, 23 denotes a single-variable process, i.e., a process comprising only one manipulated variable u and only one measured or controlled variable y. The invention can also be applied, of course, to multiple-variable processes comprising several manipulated variables and several measured variables. The controlled variable y is subtracted in a mixing element 1 from its setpoint value y*, and the system deviation e is obtained. This system deviation e is fed to the controller block 29 and is processed there into the manipulated variable u. The controller block 29 contains n separate controllers R1 . . . Rn, which are allocated to n selected working points of the process and are designed for these working points. The controllers R1 to Rn can be of any desired type. For example, these controllers could be conventional controllers exhibiting proportional (P), Proportional-integration (PI) or proportional-integration-derivative (PID) control response, or even state controllers or the like. The performance of each controller is determined by its controller parameters. In the depicted example, it is assumed that each of the controllers R1 . . . Rn has q adjustable controller parameters. This is indicated for controller R1 by $k_{1,1}$ to $k_{1,q}$ and for controller $R_n$ by $k_{n,1}$ to $k_{n,q}$.

The output signals $u_1 \ldots u_n$ from n controllers R1 . . . Rn are multiplied by weights $w_1 \ldots w_n$, and the thus weighted controller output signals are summed in a mixing element 2. In this manner, the controllers R1 . . . Rn work in parallel. It can be determined on the basis of the weights $w_1 \ldots w_n$, to what extent the controllers influence the output. In principle, the closer one is to the working point allocated to a controller in the course of the process, the greater the influence of that controller should have on the process. Conversely, a controller should have less influence the further one is from the working point allocated to the controller. In the final analysis, this leads to a complete decoupling or rather disconnecting of the controller in question, when the actual working point is relatively far from the allocated working point. For example, if one or more of the weights $w_1 \ldots w_n$ becomes zero, then the controller allocated at the time is virtually disabled and no longer participates in further closed-loop control. By continuously varying these weights, it is possible for a controller to be gradually switched on or off with the desired degree of smoothness, i.e., interpolation.

Since the sum of the weights $w_1 \ldots w_n$ generally does not equal one, the device 3 is provided for scaling purposes. As used here, scaling means altering a set of quantities by a fixed quantity to bring the values within limits capable of being handled by the equipment or programs being used. This device 3 formulates a weighted average value u from the sum of the weighted controller output signals $u_1 \ldots u_n$, according to the relationship $$u = \frac{(u_1 \cdot w_1 + u_2 \cdot w_2 + \ldots + u_n \cdot w_n)}{(w_1 + w_2 + \ldots + w_n)} \quad (1)$$

with u being the manipulated variable for the process 23. This guarantees that each controller always has an effect on the component defined by its weight in relation to the sum of the weights. As follows from equation (1), the signal averager 3 comprises a division unit, whose dividend input is supplied with the output signal from the mixing element 2, as well as of an additional mixing element for formulating the sum of the weights $w_1 \ldots w_n$ to create the divisor of this division unit.

The weights $w_1 \ldots w_n$ are determined, together with the working-point parameters $p_1 \ldots p_r$ that dominantly influence the process performance, in the functional block 25 in a way that will be described in greater detail further on. The parameters of the controllers, which have been optimized for the selected working points, are adapted to changes in further working-point parameters $p_{r+1} \ldots p_m$ in the arithmetic block 27. The selection of the working-point parameters, whose variations are drawn upon to adaptively influence the parameters $k_{1,1} \ldots k_{n,q}$ of the n controllers, complies with the specific conditions of the particular process under control. These parameters can be all of the parameters of the quantity 21 of the working-point parameters or, as depicted in the example of FIG. 1, only a portion of these working-point parameters, i.e., not including the parameters $p_1 \ldots p_r$ that dominantly influence the process performance.

The controller parameters $k_{1,1} \ldots k_{n,q}$ output by the adaptation device 27 each contain a constant component $a_{1,1,0} \ldots a_{n,q,0}$, which guarantee an optimal controller performance for certain values of the working-point parameters $p_{r+1} \ldots p_m$ and for the values of the dominant working-point parameters $p_1 \ldots p_r$ corresponding to each controller in accordance with the working point allocated to it. These constant controller-parameter components are determined based on expertise garnered from experience with the process to be controlled or, however, in the usual way, i.e., empirically, for example on the basis of a process model or by means of process simulations. In this manner, one is able to determine how the controller parameters should be changed in case of variations in the working-point parameters $p_{r+1} \ldots p_m$, so that one continues to achieve optimal controller performance.

To realize the adaptation device 27, one starts from the assumption that the changes in the controller parameters have a linear dependence on the changes in the working-point parameters. These controller parameters are required for optimal closed-loop control and are close to the particular working point. Therefore, the values of the working point parameters $p_{r+1} \ldots p_m$ supplied to the adaptation device are processed in the adaptation device in the following manner into controller parameters $k_{1,1} \ldots k_{n,q}$:

$$\begin{aligned}
k_{1,1} &= a_{1,1,0} + a_{1,1,r+1} * \Delta p_{r+1} \ldots a_{1,1,m} * \Delta p_m \\
k_{1,2} &= a_{1,2,0} + a_{1,2,r+1} * \Delta p_{r+1} \ldots a_{1,2,m} * \Delta p_m \\
&\quad \cdot \quad \cdot \quad \cdot \quad * \Delta p_{r+1} \ldots \cdot \quad * \Delta p_m \\
&\quad \cdot \quad \cdot \quad \cdot \quad * \Delta p_{r+1} \ldots \cdot \quad * \Delta p_m \\
&\quad \cdot \quad \cdot \quad \cdot \quad * \Delta p_{r+1} \ldots \cdot \quad * \Delta p_m \\
k_{n,q} &= a_{n,q,0} + a_{n,q,r+1} * \Delta p_{r+1} \ldots a_{n,q,m} * \Delta p_m
\end{aligned} \quad (2)$$

whereby $\Delta p_{r+1} \ldots \Delta p_m$ are current deviations from specified values of the working-point parameters $p_{r+1} \ldots p_m$, which deviations are formulated in the adaptation device 27. In each case, the ratio between a change in a controller parameter found by means of simulation and the allocated change in the working parameter is employed as a constant coefficient $a_{i,j,r+s}$. For example, for the coefficient, which defines the effect a change in the working-point parameter $p_{r+1}$ has on the controller parameter $k_{n,q}$ (see system of equations (2)), it applies that:

$$a_{n,q,r+1} = \frac{(\Delta k_{n,q})_{sim}}{(\Delta p_{r+1})_{sim}} \quad (3)$$

whereby the subscript "sim" signifies that these values were found by means of simulation.

Thus, for each controller parameter, the adaptation device 27 realizes a linear adaptation law, according to which the controllers $R_1$ through $R_n$ are adapted to the changes in the working-point parameters $p_{r+1}$ to $p_m$, to achieve an optimal control response. As proceeds from the system of equations (2), all that are required here are differentiators to determine the current deviations $\Delta p_{r+1} \ldots \Delta p_m$ from the values of the parameters $p_{r+1} \ldots p_m$ allocated to the selected working points, proportional amplifiers, whose amplification factor corresponds to the constant coefficients $a_{i,j,r+s}$, and summing elements. In place of this linear adaptation, a non-linear adaptation, which entails a correspondingly greater degree of complexity, could also be provided.

The dominant operating parameters $p_1 \ldots p_r$ are fed on the input side to the functional block denoted by 25, whose output signals $w_1 \ldots w_n$ constitute the weights for the manipulated variables $u_1 \ldots u_n$ made available by the controllers $R_1 \ldots R_n$. This functional block 25 consists in principle of n multivariable function generators, i.e., n function generators, each having one output and several inputs, which receive the dominant working-point parameters $p_1 \ldots p_r$. The functional block 25 is able to be advantageously realized with fuzzy logic, since it allows complex interconnections of the input variables to be resolved while exploiting knowledge about the process based on experience and meeting the requirements of actual practice. Fuzzy logic and its application are described, for example, in the German periodical *Automatisierungstechnische Praxis* [Automation Practice]33 (1991), 10th issue, pp. 504–510.

In its realization by means of fuzzy logic, the functional block 25 implements the membership functions that are typical of fuzzy logic. To be precise, n membership functions, which are allocated to the n operating points, are provided for each operating-point parameter $p_1$ through $p_r$.

Figure 2:
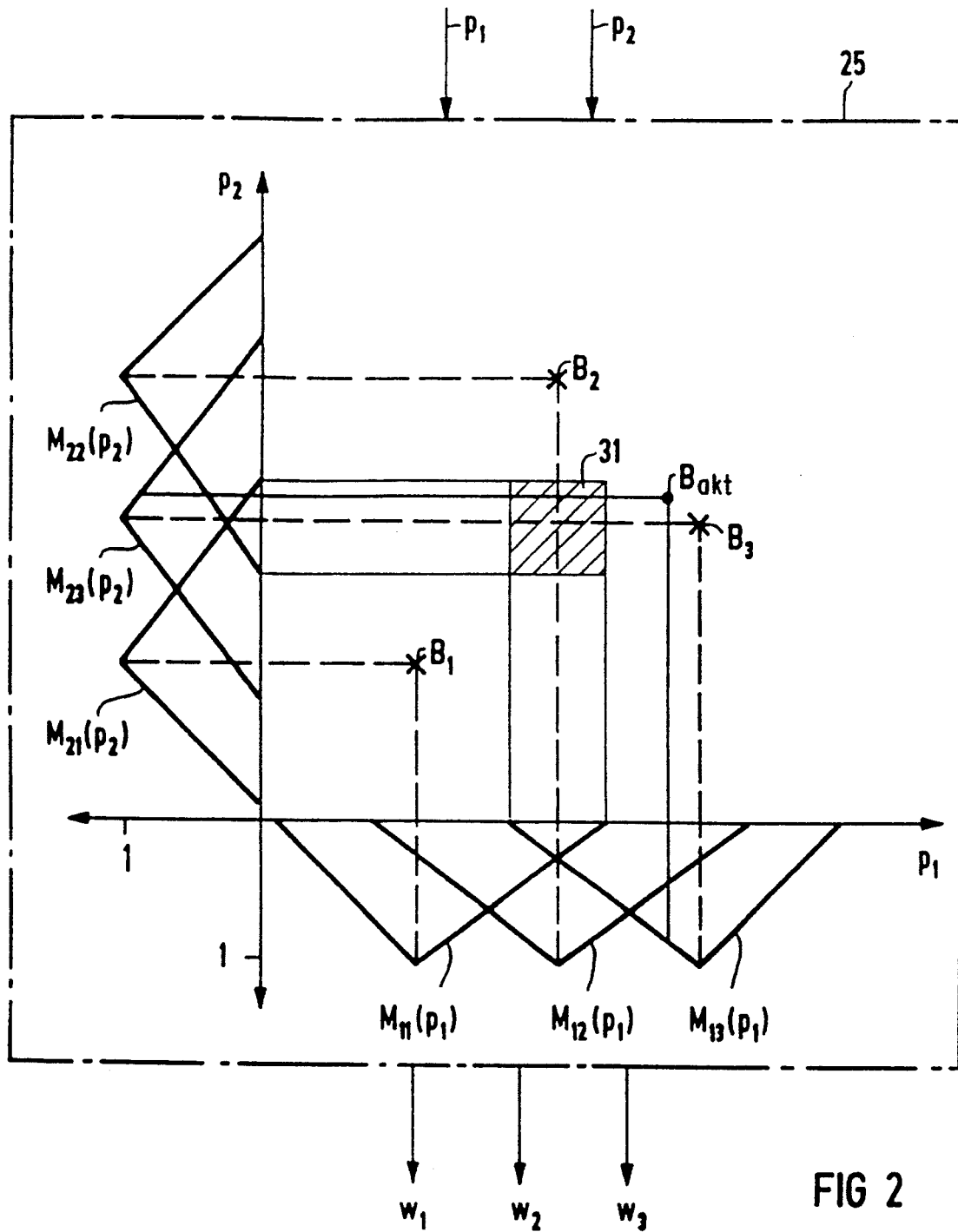
FIG. 2 depicts an example of membership functions for three working points and two dominant working-point parameters.

FIG. 2 serves to clarify the design and mode of operation of the functional block 25, which works with fuzzy logic, on the basis of an example. This example is kept simple for the sake of clarity and shows $r=2$ dominant working-point parameters $p_1$ and $p_2$ as input variables and selected working points $B_1$, $B_2$ and $B_3$ for $n=3$. Allocated to these working points in each case is a membership function with the variables $p_1$, namely $M_{11}(p_1)$, $M_{12}(p_1)$ and $M_{13}(p_1)$, as well as with the variables $p_2$, namely $M_{21}(p_2)$, $M_{22}(p_2)$ and $M_{23}(p_2)$ in such a way that, in each case, these functions show their maximum value of 1 in the corresponding working point. As depicted, they can have triangular characteristic curves, however trapezoidal, parabolic, or bell-shaped characteristic curves are also possible, for example. The only important consideration in this connection is that the membership functions continuously decline with increasing distance from the particular working point allocated to them and that they overlap thereby, so that the transition among the controllers is not made abruptly, but rather "smoothly" with interpolation. In the case of the triangular functions depicted in FIG. 2, their bases establish in which area the allocated controller can become active. Generally, several differently weighted controllers are active at the same time, i.e., the corresponding output variables of the functional block 25 which constitute the weights $w_1$, $w_2$ and $w_3$ show a value that differs from zero. Thus, in the shaded area 31 in FIG. 2, all three controllers would be in operation, and controllers $R_2$ and $R_3$ in working points $B_2$ and $B_3$, while only the controller $R_1$ has an effect in the working point $B_1$.

The rules to be implemented by the functional block 25 for the participation of the three controllers $R_1$, $R_2$ and $R_3$ are able to be formulated in the following way with the terminology of the fuzzy logic:

IF ($p_1$ is $M_{11}$) AND ($p_2$ is $M_{21}$) THEN ($R_1$ ACTIVE)

IF ($p_1$ is $M_{12}$) AND ($p_2$ is $M_{22}$) THEN ($R_2$ ACTIVE)

IF ($p_1$ is $M_{13}$) AND ($p_2$ is $M_{23}$) THEN ($R_3$ ACTIVE)  (4)

whereby the truth values of the THEN statements, that is the degrees of participation or rather the weights $w_1$, $w_2$ and $w_3$ of the controllers $R_1$, $R_2$ and $R_3$ are determined according to the logical rules of fuzzy logic as $$w_1 = \text{Min}[M_{11}, M_{21}]$$

$$w_2 = \text{Min}[M_{12}, M_{22}]$$

$$w_3 = \text{Min}[M_{13}, M_{23}] \quad (5)$$

For the operating point $B_{akt}$ that is assumed to be current for exemplary purposes, the evaluation of the membership functions depicted in FIG. 2 would result in the following concrete values in accordance with the system of equations (5) for $B_{akt}$:

$$w_1 = \text{Min}[0.00, 0.11] = 0.130$$

$$w_2 = \text{Min}[0.42, 0.37] = 0.37$$

$$w_3 = \text{Min}[0.84, 0.89] = 0.84 \quad (6)$$

At the current operating point $B_{akt}$, the controller allocated to the operating point $B_2$ operates with the weighting factor 0.37, and the controller allocated to the operating point $B_3$ operates with the weighting factor 0.84.

As can be inferred from FIG. 2 and the system of equations (5), in this example, the functional block 25 can be set up with six function generators and three minimum connections. Instead of this, one can also use commercially available fuzzy-logic modules in an integrated form or fuzzy computers, as is occasionally recommended by today's state of technological development, i.e., not to implement the functions of the controller block 29 and of the adaptation device 27 by means of discrete components, but rather by means of microprocessors.

FIG. 3 depicts an application example of the method according to the present invention for controlling tape tension in the case of reel-to-reel drive. Depicted in detail is an electrical drive motor 5, which is coupled by way of a gear unit 6 to the reel 4. The band-shaped material web 7 is guided over an idler pulley 10 as well as over guide rollers 9 and 11 and exits at a velocity of $v_B$ from a device denoted by 12, which can consist, for example, of a supply reeler or a roll stand. The tape tension is detected by means of the idler pulley 10, in that its bearings are braced against a pressure cell or piezoelectric gauge, and an amplifier 14 connected up to its output terminals supplies a direct voltage Z which is proportional to the tape tension. This voltage is compared in the mixing element 1 to a direct voltage that is proportional to the desired setpoint value of the tension $Z^*$, and the output signal from the mixing element is fed to the controller block 29. Subordinate to the tape-tension controller 29 is a speed controller 15, in which the output variable of the tape-tension controller formulates its setpoint value. Its actual value is the direct voltage $n_H$, which is supplied by a tachodynamo 8 and is proportional to the rotational speed of the reel. The speed controller 15 exhibits the proportional gain KP. Subordinate to this, in turn, is a controller 16 for the current of the drive motor 5.

In principle, the elements 29, 27, 25 of the tape-tension-controlling device correspond to the elements of FIG. 1 having the same reference numerals. The moment of inertia $J_H$ of the reeler, the tape thickness, and the velocity of the tape as it exits from the roll stand 12 are provided as dominant working parameters, whereby the functional block 25 is not supplied with the actual values of the last-mentioned variables, which values are encumbered with errors, but is rather supplied with their setpoint values $d_B^*$ and $v_B^*$. In this manner, a stabilization of the tension control is achieved. A variable MT corresponding to the material hardness and a variable KP corresponding to the proportional gain of the reel-speed controller 15 are fed as additional working-point parameters to the adaptation device 27.

If necessary, both the number of working-point parameters considered to be dominant as well as the number of additional working-point parameters can be increased to almost any desired amount, whereby the method according to the invention guarantees that the closed-loop control remains manageable, despite of any resultant rise in complexity.

What is claimed is:

1. A method for performing closed-loop process control using a plurality of controllers operating in parallel, comprising the steps of:
   a) allocating each of said plurality of controllers to a selected working point;
   b) weighting a plurality of output signals from said plurality of controllers in dependence upon a plurality of working-point parameters that have a dominant influence on the performance to be controlled; and
   c) formulating a weighted mean value from a sum of the weighted plurality of output signals from said plurality of controllers and a sum of a plurality of corresponding weights, wherein said weighted mean value effects the process as a manipulated variable.

2. The method according to claim 1, further comprising the step of linearly adapting a plurality of parameters of said plurality of controllers that have been optimized for said selected working points to changes in a plurality of additional working-point parameters.

3. A method for performing closed-loop process control using a plurality of controllers operating in parallel, comprising the steps of:
   a) allocating each of said plurality of controllers to a selected working point;
   b) weighting a plurality of output signals from said plurality of controllers using overlapping membership functions of a fuzzy logic in dependence upon a plurality of working-point parameters that have a dominant influence on the performance of the process to be controlled ; and
   c) formulating a weighted mean value from a sum of the weighted plurality of output signals from said plurality of controllers and a sum of a plurality of corresponding weights, wherein said weighted mean value effects the process as a manipulated variable.

4. The method according to claim 3, further comprising the step of linearly adapting a plurality of parameters of said plurality of controllers that have been optimized for said selected working points to changes in a plurality of additional working-point parameters.

5. A method for performing closed-loop process control for controlling tape tension in a reel-to-reel tape drive using a plurality of controllers operating in parallel, comprising the steps of:
   a) allocating each of said plurality of controllers to a selected working point;
   b) activating said plurality of controllers in a weighted manner in dependence upon a plurality of working-point parameters that have a dominant influence on the performance of the process to be controlled, wherein said plurality of working point parameters comprises a moment of inertia of a takeup reel, a tape thickness, and a tape velocity;
   c) weighting a plurality of output signals from said plurality of controllers using an overlapping membership function of a fuzzy logic in dependence upon said plurality of working-point parameters; and
   d) formulating a weighted mean value from a sum of the weighted plurality of output signals and a sum of a plurality of corresponding weights, wherein said weighted mean value effects the process as a manipulated variable.

6. The method according to claim 5, further comprising the step of linearly adapting a plurality of parameters of said plurality of controllers that have been optimized for said selected working points to changes in a plurality of additional working-point parameters.

7. The method according to claim 6, wherein said plurality of working-point parameters further comprises a setpoint value of tape thickness and a setpoint value of tape velocity.

8. The method according to claim 6, wherein said plurality of additional working points comprises a material hardness of a winding material.

9. The method according to claim 5, wherein said plurality of working-point parameters further comprises a setpoint value of tape thickness and a setpoint value of tape velocity.

10. The method according to claim 9, wherein said plurality of additional working points comprises a material hardness of a winding material.

11. The method according to claim 5, wherein said plurality of additional working points comprises a material hardness of a winding material.

12. A method for performing closed-loop process control for controlling tape tension in a reel-to-reel tape drive using a plurality of controllers operating in parallel and using a subordinate closed-loop speed controller, comprising the steps of:
   a) allocating each of said plurality of controllers to a selected working point; and
   b) activating said plurality of controllers in a weighted manner in dependence upon a plurality of working-point parameters that have a dominant influence on the performance of the process to be controlled, wherein said plurality of working point parameters comprises a moment of inertia of a takeup reel, a tape thickness, and a tape velocity;
   c) weighting a plurality of output signals from said plurality of controllers using an overlapping membership function of a fuzzy logic in dependence upon said plurality of working-point parameters;
   d) formulating a weighted mean value from a sum of the weighted plurality of output signals and a sum of a plurality of corresponding weights, wherein said weighted mean value effects the process as a manipulated variable; and
   e) linearly adapting a plurality of parameters of said plurality of controllers that have been optimized for said selected working points to changes in a plurality of additional working-point parameters, wherein said plurality of additional working-point parameters comprises a proportional gain of the subordinate closed-loop speed controller.

13. The method according to claim 12, wherein said plurality of working-point parameters further comprises a setpoint value of tape thickness and a setpoint value of tape velocity.

14. The method according to claim 13, wherein said plurality of additional working points further comprises a material hardness of a winding material.

* * * * *